H. A. RAEDEKER.
INDICATOR.
APPLICATION FILED SEPT. 2, 1909.

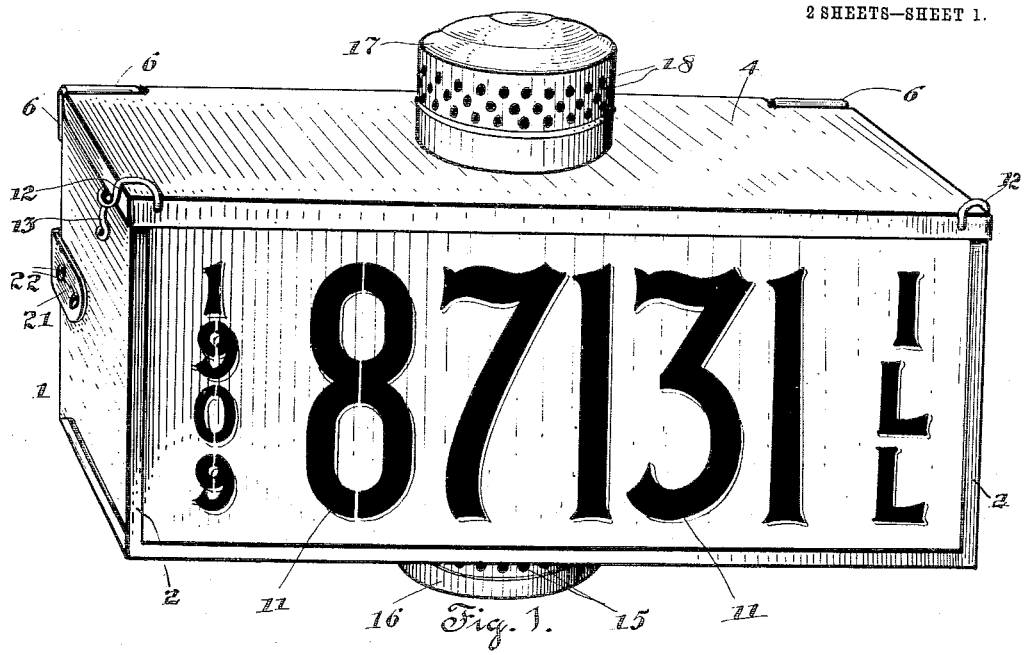
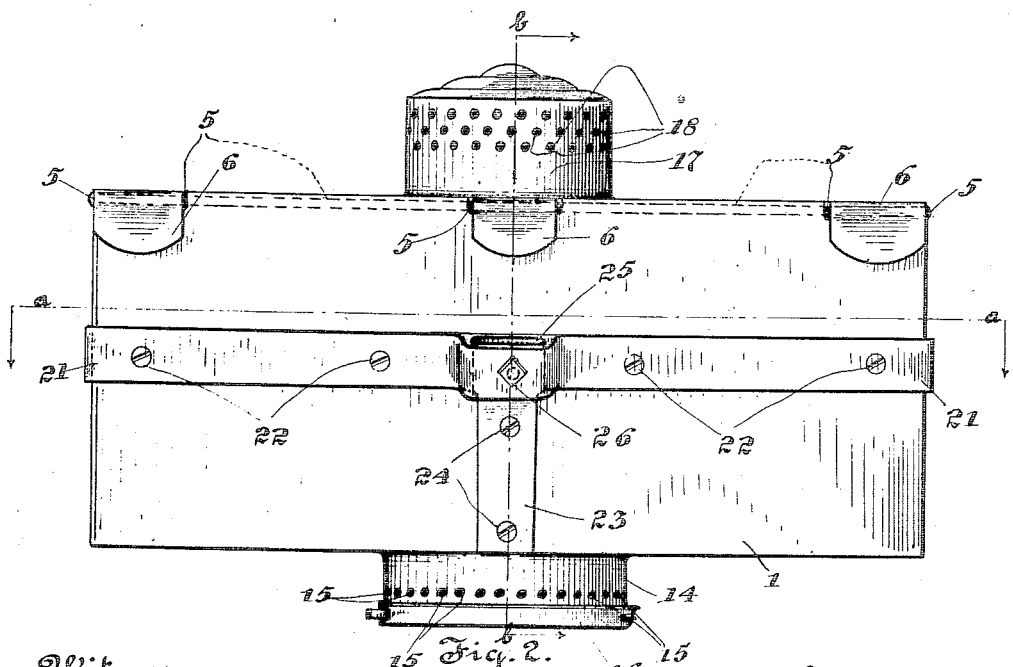

953,762.

Patented Apr. 5, 1910.
2 SHEETS—SHEET 2.

Witnesses
W. C. Smith
B. G. Richards

Inventor
Henry A. Raedeker,
By Joshua R. H. Potts
his Attorney.

UNITED STATES PATENT OFFICE.

HENRY A. RAEDEKER, OF MELROSE PARK, ILLINOIS.

INDICATOR.

953,762.  Specification of Letters Patent.  Patented Apr. 5, 1910.

Application filed September 2, 1909. Serial No. 515,873.

*To all whom it may concern:*

Be it known that I, HENRY A. RAEDEKER, a citizen of the United States, residing at Melrose Park, county of Cook, and State of Illinois, have invented certain new and useful Improvements in Indicators, of which the following is a specification.

My invention relates to improvements in indicators and has for its object the production of an indicator which shall be especially adapted for use in exhibiting the license number of automobiles.

My invention consists in the combination and arrangement of parts hereinafter described and claimed.

Figure 3:
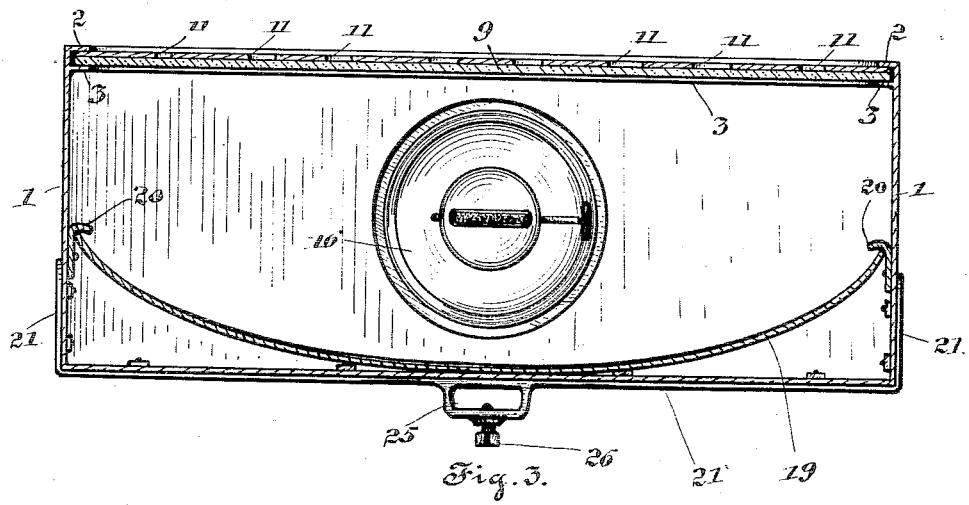
Figure 4:
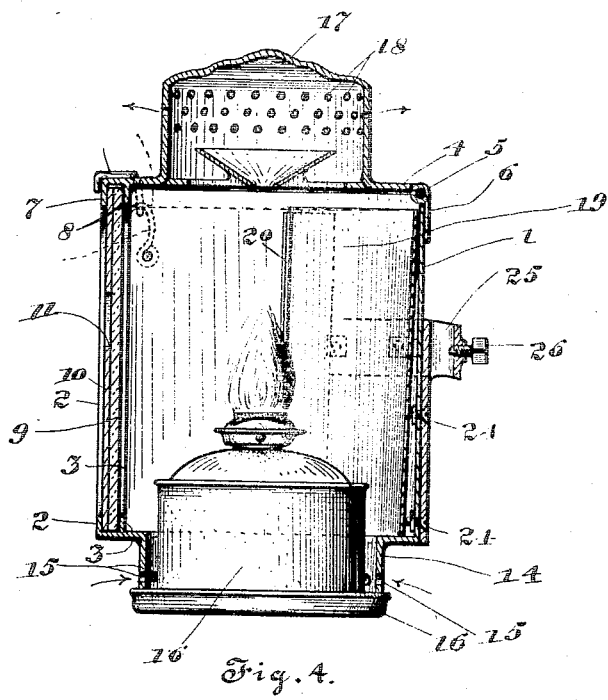

My invention will be best understood by reference to the accompanying drawings forming a part of this specification, and in which, Figure 1 is a perspective view of an indicator embodying my invention, Fig. 2, a rear view of the indicator, Fig. 3, a section on line *a—a* of Fig. 2, and Fig. 4, a section on line *b—b* of Fig. 2.

In the preferred form of construction, as illustrated in the drawings, the indicator comprises a rectangular metallic body portion 1. At the front edges of the ends and bottom of the body portion 1 are provided outer and inner flanges 2 and 3 forming a receiving channel between them. The body portion 1 is closed at the top by metallic lid 4 hinged to the back by means of a rod 5 passing through ears 6 secured to said back. At its forward edge the lid 4 is provided with downwardly extending flanges 7 and 8 forming a receiving channel adapted to coöperate with the channel formed by flanges 2 and 3. In the channel formed by flanges 2 and 3 are placed a red glass 9 and a metallic plate 10 having openings or perforations 11 indicative of the license number of a vehicle as indicated in the drawings. To the sides of lid 4 are secured eyes 12 adapted to receive locking hooks 13 pivoted to the sides of body 1. By this construction it will be seen that the glass plate 9 may be readily removed for cleaning or replaced if broken and the license plate 10 removed or replaced as desired, the flanges on lid 4 serving to secure and lock both in place when said lid is closed.

Communicating with the bottom of the body portion 1 is a tubular sleeve 14 having draft perforations 15 in the sides thereof. Detachable means are provided for securing a lamp 16 in said sleeve with the wick projecting into the interior of body portion 1. At its top the body portion 1 is provided with a draft dome 17 having draft perforations 18. By this means it will be seen that the interior of the body portion may be illuminated and the lamp removed and replaced for filling or other attentions.

A removable metallic reflector 19 is secured in body portion 1 behind lamp 16 so as to reflect the light into plate 9. The reflector 19 is preferably secured in place by means of brackets 20 secured to the sides of the body portion 1 in such relation to the back thereof and to the length of said reflector that the reflector has to be bent as indicated in order to be inserted in said brackets with its rear portion in contact with the rear of the body portion. By this construction the reflector 19 may be readily removed for cleaning or polishing and the tension under which it is placed in position will hold it in position and prevent rattling.

The body portion 1 is supported in a bracket comprising horizontal arms 21 secured to the back and ends of said body portion by means of bolts 22 and a vertical arm 23 secured to said back by means of bolts 24. At its rear central portion the bracket is provided with a boss having a socket 25 therein and a clamping screw 26 coöperating with said socket. The indicator is secured in position by placing the socket 25 over a suitable lug or spur carried by the automobile or other vehicle and tightening the clamping screw 26 thereon.

By this construction it will be seen that the license number of a vehicle will be indicated during the day by the contrast between the color of the plate 9 and the plate 10, and at night by the red light showing through the openings in plate 10. The license plate is usually secured to the rear of such vehicles, in which position the red light emitted by plate 9 will also serve as a danger signal.

While I have illustrated and described the preferred construction for carrying my invention into effect, this is capable of variation and modification without departing from the spirit of my invention. I, therefore, do not wish to be limited to the exact details of construction set forth, but desire to avail myself of such variations and modifications as come within the scope of the appended claim.

Having described my invention what I claim as new and desire to secure by Letters Patent is:

An indicator comprising a metallic body portion provided with a hinged lid having outer and inner flanges at the front edge thereof; similar outer and inner flanges on the front edges of the ends and bottom of said body portion; colored glass secured between said flanges; an opaque plate also secured between said flanges; vertical brackets secured to the sides of said body portion; and a reflector adapted to be secured in said brackets, the relations being such that said reflector must be flexed to enter said brackets, substantially as described.

In testimony whereof I have signed my name to this specification in the presence of two subscribing witnesses.

HENRY A. RAEDEKER.

Witnesses:
HELEN F. LILLIS,
JOSHUA R. H. POTTS.